(12) United States Patent
Turkbey et al.

(10) Patent No.: US 12,392,391 B2
(45) Date of Patent: Aug. 19, 2025

(54) VIBRATION ISOLATOR FOR SUPPORTING A PAYLOAD

(71) Applicants: CARL ZEISS SMT GMBH, Oberkochen (DE); ASML Netherlands B.V., Veldhoven (NL)

(72) Inventors: Galip Tuna Turkbey, Veldhoven (NL); Hubertus Renier Maria Van Lierop, Veldhoven (NL); Alexander Petrus Josephus Van Lankvelt, Veldhoven (NL); Erik Roelof Loopstra, Ederheim Huernheim (DE); Ahmet Levent Avsar, Veldhoven (NL)

(73) Assignees: CARL ZEISS SMT GMBH, Oberkochen (DE); ASML NETHERLANDS B.V., Veldhoven (NL)

( * ) Notice: Subject to any disclaimer, the term of this patent is extended or adjusted under 35 U.S.C. 154(b) by 407 days.

(21) Appl. No.: 17/947,016

(22) Filed: Sep. 16, 2022

(65) Prior Publication Data

US 2023/0085971 A1 Mar. 23, 2023

(30) Foreign Application Priority Data

Sep. 17, 2021 (EP) ..................... 21197474

(51) Int. Cl.
*F16F 15/023* (2006.01)
*F16F 9/04* (2006.01)
*F16F 9/05* (2006.01)

(52) U.S. Cl.
CPC ........ *F16F 15/0232* (2013.01); *F16F 9/0436* (2013.01); *F16F 9/05* (2013.01); *F16F 9/0454* (2013.01); *F16F 2224/046* (2013.01)

(58) Field of Classification Search
CPC .... F16F 9/02; F16F 9/04; F16F 9/0454; F16F 9/0436; F16F 9/05; F16F 15/0232;
(Continued)

(56) References Cited

U.S. PATENT DOCUMENTS 321,768 A * 7/1885 Smith ................. F16F 9/0418
267/35
3,037,793 A * 6/1962 Gouirand ........... B62D 53/0842
267/64.11
(Continued)

FOREIGN PATENT DOCUMENTS

CN 208203885 U 12/2018
JP 63235738 A 9/1988
(Continued)

OTHER PUBLICATIONS

EP Search Report, Application No. 21197474.6, Mar. 9, 2022, 7 pages.
(Continued)

*Primary Examiner* — Thomas J Williams
(74) *Attorney, Agent, or Firm* — Edell, Shapiro & Finnan, LLC

(57) ABSTRACT

A vibration isolator (10) for supporting a payload and isolating the payload from vibrations has: a pressurized gas compartment (24) formed with a rigid base structure (28), which base structure has an opening (32) covered with a flexible membrane (20) having an inner surface (21) facing into the gas compartment and an outer surface (22) facing in the opposite direction, a support member (12) for supporting the payload, which support member is arranged in contact with the outer surface (22) of the membrane, and a clamping member (62) arranged at the inner surface (21) of the membrane, wherein the support member and the clamping member form a clamping system (66), which system
(Continued)

includes at least one magnetic element (64) effecting the membrane to be pressed against the support member.

16 Claims, 3 Drawing Sheets

(58) Field of Classification Search
CPC .... F16F 15/023; F16F 15/04; F16F 2224/046; A45C 13/1069; F16B 1/00
USPC ................................ 267/35, 64.27, 118, 122
See application file for complete search history.

(56) References Cited

U.S. PATENT DOCUMENTS

| | | | | |
|---|---|---|---|---|
| 3,578,278 | A * | 5/1971 | Pickering | F16F 15/0275 |
| | | | | 248/631 |
| 3,773,286 | A * | 11/1973 | Govoni | B65B 67/12 |
| | | | | 248/156 |
| 3,917,201 | A * | 11/1975 | Roll | G12B 5/00 |
| | | | | 248/631 |
| 3,924,631 | A * | 12/1975 | Mancusi, Jr. | A61B 17/122 |
| | | | | 128/DIG. 25 |
| 5,918,862 | A | 7/1999 | Nelson | |
| 6,215,381 | B1 * | 4/2001 | Aoki | A45C 13/1069 |
| | | | | 335/207 |
| 6,547,225 | B1 | 4/2003 | Nelson | |
| 6,987,559 | B2 | 1/2006 | Philips et al. | |
| 2004/0140415 | A1 * | 7/2004 | Watson | F16F 15/0275 |
| | | | | 248/560 |
| 2006/0049557 | A1 | 3/2006 | Motz | |
| 2017/0360171 | A1 * | 12/2017 | Weber | F16B 1/00 |
| 2023/0085971 | A1 * | 3/2023 | Turkbey | F16F 15/0232 |
| | | | | 267/136 |

FOREIGN PATENT DOCUMENTS

| | | |
|---|---|---|
| JP | H0226333 A | 1/1990 |
| JP | 2005036838 A | 2/2005 |
| JP | 2009192053 A | 8/2009 |
| JP | 2014177963 A | 9/2014 |
| JP | 2021081003 A | 5/2021 |
| WO | WO-0075527 A1 * 12/2000 | ............. B60N 2/522 |

OTHER PUBLICATIONS

"Membrane air spring for effective vibration damping", https://www,bilz,ag.en/menbrane-air-springs/, May 23, 2021, 2 pages.
Japanese Office Action with English translation, Application No. 2022-136681, Nov. 21, 2023, 12 pages.

* cited by examiner

VIBRATION ISOLATOR FOR SUPPORTING A PAYLOAD

CROSS-REFERENCE TO RELATED APPLICATIONS

This application claims priority to the European Patent Application EP21197474.6 filed on Sep. 17, 2021. The entire disclosure of this patent application is incorporated into the present application by reference.

FIELD OF THE INVENTION

The invention relates to a vibration isolator for supporting a payload and isolating the payload from vibrations, which vibration isolator comprises a pressurized gas compartment.

BACKGROUND

Vibrations in the form of very low amplitude, omnidirectional motion is naturally present in any building, and is present at varying levels at all frequencies up to very high acoustic frequencies. The acceleration associated with such vibrations introduces stress into the structures of many types of sensitive equipment. For example, these vibrations may be introduced into sensitive elements of a measurement setup for measuring the quality of optical elements used in a microlithographic projection exposure tool and therewith reduce the measuring accuracy.

Vibration isolators may be used to dampen the motion of the payload caused by movement of components supported by the payload. In the semiconductor industry, for example, it is common to have a heavy and fast moving stage carrying a wafer, which stops at different locations on the wafer to make an inspection. The stage motion causes the payload to move on its isolators. The measurement, however, cannot be performed until this motion has died away. Therefore, it is critically important to the throughput of such systems that the isolators damp as quickly as possible.

U.S. Pat. No. 5,918,862 discloses a pneumatic vibration isolator comprising two gas compartments in the form air chambers connected via a damping orifice. The first air chamber comprises an opening containing a movable piston acting as a support member for supporting a payload. A gap between the rim of the opening of the first air chamber and the piston is covered by an annular flexible rolling diaphragm or membrane. However, in such annular membranes the connection between the membrane and the piston may not always be perfectly leak-tight, especially when the vibration isolator is operated in a vacuum environment.

This problem may be solved by configuring the membrane such that it covers the entire opening of the vibration isolator and placing the piston on top of the membrane. However, in such a configuration the piston is susceptible to moving from a desired centered position on the membrane to an off-centered position during operation of the vibration isolator and during cycles of deflating and inflating the gas compartment. The resulting misalignment of the piston may cause a malfunction of the vibration isolator or at least reduce the vibration isolation efficiency of the isolator.

SUMMARY

It is an object of the invention to provide a vibration isolator of the type set forth at the outset, with which the aforementioned problems are addressed and/or resolved. A further object is to provide a vibration isolator that is optimized to prevent leaks of the gas compartment and at the same time does not suffer from misalignment of the support member. The protection from misalignment of the support member is preferably ensured both during operation of the vibration isolator and during cycles of deflating and inflating the gas compartment.

According to one formulation of the invention, the aforementioned objects are addressed, for example, by a vibration isolator for supporting a payload and isolating the payload from vibrations, comprising: a pressurized gas compartment formed with a rigid base structure, which base structure has an opening covered with a flexible membrane having an inner surface facing into the gas compartment and an outer surface facing in the opposite direction, a support member for supporting the payload, which support member is arranged in contact with the outer surface of the membrane, and a clamping member arranged at the inner surface of the membrane, wherein the support member and the clamping member form a clamping system, which system comprises at least one magnetic element effecting the membrane to be pressed against the support member.

The gas compartment may be filled with air or any other gas. In case of air, the vibration isolator may also be referred to as "air mount" or "air spring". The support member may have an extended contact surface being in contact with the outer surface of the membrane, wherein the extended contact surface may cover at least 50%, especially at least 80% of the outer surface of the membrane.

The support member is configured for supporting the payload. This can be done directly, i.e. the payload is arranged on the support member, or indirectly, i.e. at least another element or member can be arranged between the support member and the payload. The support member may be configured as a plate. It may also be referred to as a piston.

According to the invention, the opening of the rigid base structure is covered with the flexible membrane. This way a connection between the membrane and the support member, which is susceptible to tearing, is avoided. Therefore, the opening of the gas compartment is sealed very well against gas leaks. Further, a possible misalignment of the support member in the membrane, caused by a movement of the support member on the membrane, is prevented by the clamping system. This is due to the clamping system being configured to press the membrane against the contact surface by magnetic force.

In contrast a clamping system using a bolt or any other mechanical fixation member to fix the clamping member to the support member by piercing through the membrane, the clamping system according to the invention allows clamping the membrane without making a hole into the membrane. As the membrane remains undamaged, possible gas leaks are avoided.

According to an embodiment, the magnetic element is configured as a permanent magnet, e.g. as a neodymium-magnet. For example NdFeB material may be used to configure the magnetic element. Alternative examples for the material of the magnetic element comprise AlNiCo and samarium-cobalt.

According to a further embodiment, the magnetic element is comprised by the clamping member. That means, the magnetic element is part of the clamping member or the magnetic element forms the clamping member as a whole. In different words, the clamping member comprises the magnetic element.

According to a further embodiment, the clamping member is ring shaped, while the ring especially may be circular.

According to a further embodiment, a first one of the members of the clamping system comprises the magnetic element and the second one of the members comprises a magnet target arranged opposite to the magnetic element and configured to enable magnetic attraction between the magnetic element and the magnet target. That means, the magnetic target may be of a material that can be magnetized, e.g. a ferromagnetic material such as steel. Alternatively, the magnetic target may be a permanent magnet which itself is arranged such that its north pole faces the south pole of the magnetic element or vice versa.

According to an embodiment variation, the first member of the clamping system comprises several magnetic elements, in particular at least 4, at least 10 or at least 20 magnetic elements, arranged along a rim of the first member.

According to a further embodiment, the first member of the clamping system is the clamping member and the second member of the clamping system is the support member. That means, the clamping member comprises at least one magnetic element and the support member comprises at least one magnetic target. In an alternative embodiment, the support member may comprise at least one magnetic element and the clamping member at least one magnetic target. Further, both the support member and the clamping member may each be provided with at least one magnetic element and at least one magnetic target.

According to a further embodiment, the clamping system comprises at least two magnetic elements arranged with opposite magnetic orientations. Herewith the magnetic flux can be increased.

According to a further embodiment, the clamping system comprises at least four magnetic elements arranged with alternating magnetic orientations.

According to a further embodiment, a clamping force between the support member and the clamping member is at least 500 N, in particular at least 700 N or at least 1000 N.

According to a further embodiment, the coefficient of static friction between the support member and the membrane is at least 0.1, in particular at least 0.2, or at least 0.5. The membrane is made an elastic material, e.g. Viton®, the support member may be made of metal, e.g. aluminum. According to an embodiment the membrane is composed of Viton® and fiber layers arranged in two axes perpendicular to each other to increase the strength of the membrane.

According to a further embodiment, the pressure in the gas compartment is at least 2 bar, in particular at least 3 bar or at least 4 bar, higher than the ambient pressure.

According to a further embodiment, the vibration isolator is configured to be operated in vacuum, e.g. in high vacuum or ultra high vacuum.

According to a further embodiment, the vibration isolator further comprises a damping chamber which is connected to the gas compartment via a restriction. The restriction may comprise a throttle valve.

According to a further embodiment, the damping chamber is connected to a pressure supply line. The vibration isolator can especially be referred to as "pneumatic vibration isolator".

The features specified in respect of the embodiments, exemplary embodiments and embodiment variants etc., of the vibration isolator according to the invention, listed above and other features of the embodiments according to the invention are explained in the description of the figures and in the claims. The individual features can be implemented, either separately or in combination, as embodiments of the invention. Furthermore, they can describe advantageous embodiments which are independently protectable and protection for which is claimed if appropriate only during or after pendency of the application.

BRIEF DESCRIPTION OF THE DRAWINGS

The above and further advantageous features of the invention are illustrated in the following detailed description of exemplary embodiments according to the invention with reference to the accompanying schematic drawings. In the drawing.

DETAILED DESCRIPTION

In the exemplary embodiments or embodiments or embodiment variants described below, elements which are functionally or structurally similar to one another are provided with the same or similar reference signs as far as possible. Therefore, for understanding the features of the individual elements of a specific exemplary embodiment, reference should be made to the description of other exemplary embodiments or the general description.

Figure 1:
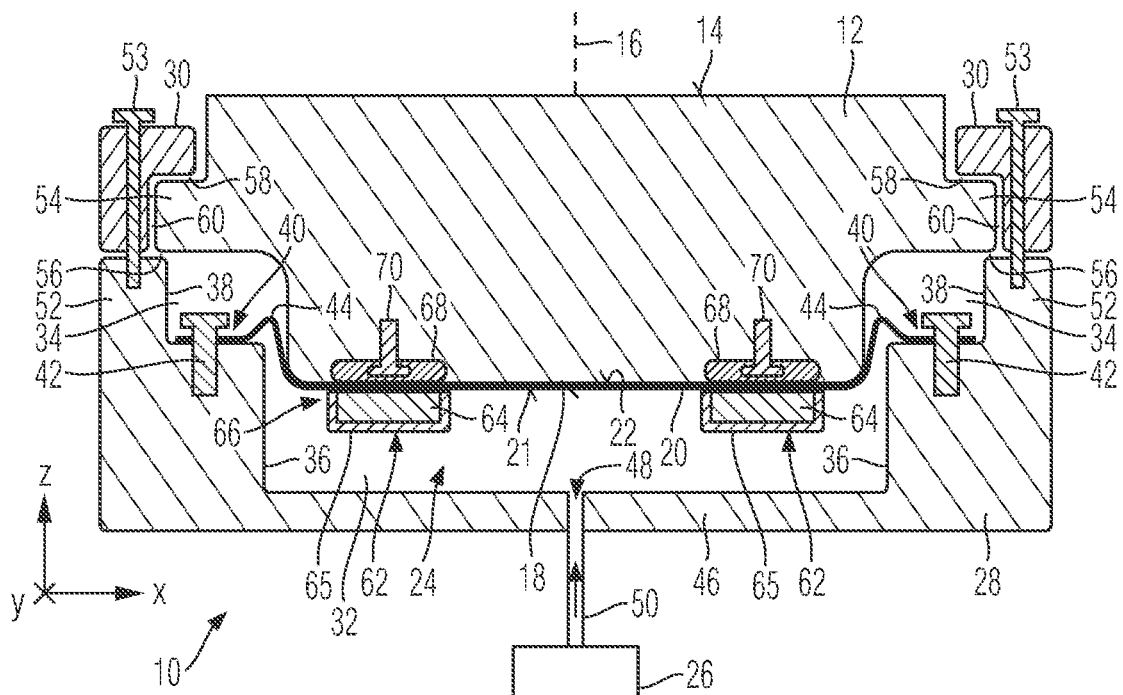
FIG. 1 shows a cross section of a first embodiment of a vibration isolator for supporting a payload an isolating the payload from vibrations in an operating state, in which a gas compartment is inflated accordingly.

In order to facilitate the description, a Cartesian xyz-coordinate system is indicated in the drawing, from which system the respective positional relationship of the components illustrated in the figures is evident. In FIG. 1, the y-direction extends perpendicularly to the plane of the drawing into said plane, the x-direction extends toward the right, and the z-direction extends upward FIG. 1 shows a cross section of a first embodiment of a vibration isolator 10 according to the invention in form of a pneumatic vibration isolator for supporting a payload and isolating the payload form vibrations. At least one of such a vibration isolator 10 may be contained in a measuring setup for measuring the quality of optical elements, especially of EUV-mirrors, for a microlithographic projection exposure tool.

Such a measuring setup may configured as an interferometric system. The vibration isolator 10 may be arranged in such a measuring setup to isolate the optical element to be tested from vibrations, i.e. the vibration isolator may be placed on a housing or base frame of the measurement setup and the optical element including its mount may be placed as payload on the vibration isolator. Other optical elements of the measurement setup may also be placed on a vibration isolator 10 in order to isolate the entire optical measurement path within the measurement setup from vibrations. Further, at least one vibration isolator may be contained within a microlithographic projection exposure tool, e.g. to isolate the projection objective or another optical system from vibrations. Such vibrations may especially be caused by the movement of stages used in the projection exposure tool to move a reticle and a wafer during the exposure process.

The vibration isolator 10 according to FIG. 1 comprises a support member 12 having a support surface 14. In the illustrated embodiment the support member 12 is rotationally symmetrical to an axis 16 oriented in the z-direction. The circular support surface 14, in FIG. 1 the top surface of the support member 12, serves for supporting the above-mentioned payload. The payload may by placed on the support surface 14 to be held in place by the friction created by its weight. Alternatively the payload may be fixed to the support surface using fixation elements like bolts or screws, etc.

The support member 12 further comprises a contact surface 18, in FIG. 1 the bottom surface of the support member 12, which contact surface 18 is in contact with a top surface, also referred to as outer surface 22, of a flexible membrane 20. The membrane is made using an elastic material, e.g. Viton®. According to an embodiment the membrane is composed of Viton® and fiber layers arranged in two axes perpendicular to each other to increase the strength of the membrane. The contact surface 18 is also referred to as "extended contact surface", as it is in contact with the outer surface 22 of the membrane 20 over an extended area, e.g. the contact surface 18 may cover at least 50% or at least 80% of the outer surface 22 of the membrane 20.

The vibration isolator 10 further comprises a pressurized gas compartment 24, a pressure supply device 26, a rigid base structure 28, and a bracket 30. The pressurized gas compartment 24 can be filled with pressurized air or any other pressurized gas or gas mixture. The gas compartment 24 is formed by the base structure 28 and the membrane 20.

The base structure 28 according to FIG. 1 is configured as a cylindrical object being rotationally symmetrical to the axis 16. The cylindrical object forming the base structure 28 has a first central cylindrical cutout 32, which essentially provides the space for the gas compartment 24. The cylindrical cutout 32 is rotationally symmetrical to the axis 16. The gas compartment 24 is surrounded by a circular side wall 32 of the base structure 28. The cylindrical object forming the base structure 28 has a second cylindrical cutout 34 having a larger radius than the first cylindrical cutout 32, also being rotationally symmetrical to the axis 16 and being arranged above the gas compartment 24. The sidewall 36 of the first cutout 32 is connected with the sidewall 38 of the second cutout 34 by a horizontal shoulder area 40.

The membrane 20 is attached to the shoulder area 40, e.g. by bolts 42 or screws as shown in FIG. 1. In other words, the opening in the base structure 28 formed by the first cutout 32 is covered with the membrane 20. Here, the membrane 20 is attached loosely, i.e. without tension, such that the gas compartment 24 can be inflated and deflated. The loose attachment is apparent in FIG. 1 from the bulged section 44 of the membrane 20 near the sidewall 36. The inner surface 21 of the membrane 20 faces into the gas compartment 24 and forms the roof of the gas compartment 24.

The bottom part 46 of the base structure 28 within the circle formed by the sidewall 36 forms a floor of the gas compartment 24. The base structure 28, in the embodiment according to FIG. 1 the bottom part 46, has an opening 48 to the gas compartment 24, to which the pressure supply device 26 is connected via a pressure supply line 50 in form of a pipe. The pressure supply device 26 supplies the gas compartment 34 with pressurized air, e.g. with a pressure of more than 2 bar, especially a pressure of about 4 bar, wherein the environment can be vacuum, i.e. have a pressure of virtually 0 bar. By varying the supply pressure, the gas compartment 24 can be inflated and deflated.

FIG. 1 shows an operating state of the vibration isolator 10, in which the gas compartment 24 is inflated to a predefined level. In the operating state the support member 12 is lifted up to a level, at which it is freely floating within the space provided between the base structure 28 and the bracket 30. In the shown embodiment the bracket 30 is ring-shaped around the axis 16 and attached by bolts 53 to the top ring-shaped section 52 of the base structure 28. Alternatively, several punctiform brackets may be arranged around the ring-shaped section 52.

As mentioned above, in the operating state the support member 12 is freely floating within the space provided between the base structure 28 the bracket 30, i.e. in this state there is a gap 56 in z-direction between a protrusion 54 of the support member 12 and the ring-shaped section 52 of the base structure 28. The protrusion 54 is also ring-shaped around the axis 16. Further, there is a gap 58 in z-direction between the protrusion 54 of the support member 12 and the bracket 30. Additionally, there is a gap 60 extending perpendicular to the z-direction between the protrusion 54 of the support member 12 and the bracket 30. In the cross-section shown in FIG. 1, the gap 60 extends in the x-direction. All of the gaps 56, 58 and 60 are preferably uniform along the ring-shape of the protrusion 54.

Figure 2:
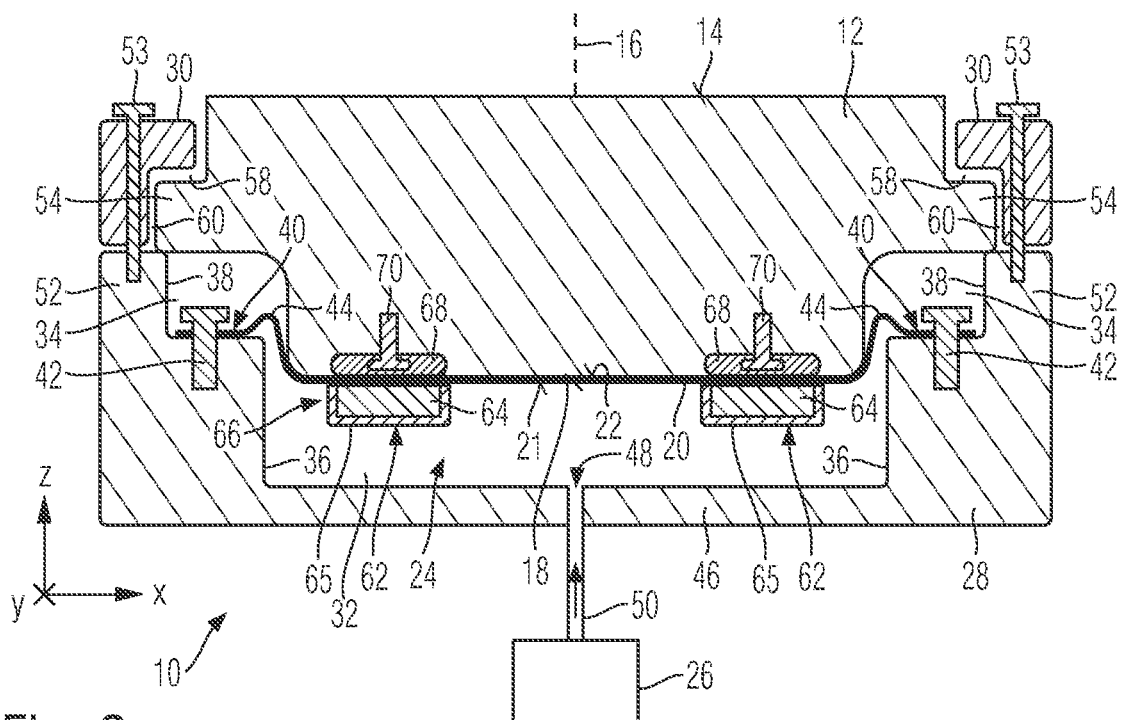
FIG. 2 depicts the vibration isolator according to FIG. 1 in a non-operating state, in which the gas compartment is deflated.

FIG. 2 shows a deflated state of the vibration isolator 10, in which the pressure supplied by the device 26 is reduced, such that the gas compartment 24 is deflated somewhat. The deflation of the gas compartment 24 results in the support member 12 being lowered such that it rests on the top ring-shaped section 52 of the base structure 28. That means, in the deflated state the gap 56 between the protrusion 54 of the support member 12 and the section 52 disappears, while the gap 58 becomes correspondingly larger.

It is important that the support member 12 remains centered within the ring-shaped bracket 30 during operation of the vibration isolator 10 and also when performing several cycles of inflating and deflating the gas compartment 24, i.e. switching back and forth between the states shown in FIGS. 1 and 2. During operation of the vibration isolator 10 vibrations are absorbed by small up and down movements of the membrane 20 slightly compressing and decompressing the gas compartment 24. These movements are typically accompanied by horizontal shearing forces between the support member 12 and the membrane 20. Also the up and down movements of the support member 12 performed during the above-mentioned cycles or inflating and deflating the gas compartment 24 are accompanied by horizontal shearing forces.

In order to avoid having the horizontal shearing forces cause a displacement of the support member 12 relative to the membrane 20, according to an aspect of the invention, a clamping member 62, comprising at least one magnetic element 64 in form of a permanent magnet and a housing structure 65, is arranged to press the membrane 20 against the contact surface 18 of the support member 12 and therewith fix the support member 12 and the membrane 20 to each other by friction.

A displacement of the support member 12 relative to the membrane 20 would result in a misalignment of the support member 12 within the vibration isolator 10, which could cause the protrusion 54 to make contact with the bracket 30 and/or the section 52 of the base structure 28. Such a misalignment could cause a malfunction of the vibration isolator 10, i.e. the efficiency of the vibration dampening function of the vibration isolator 10 could be reduced or may disappear completely.

Figure 3:
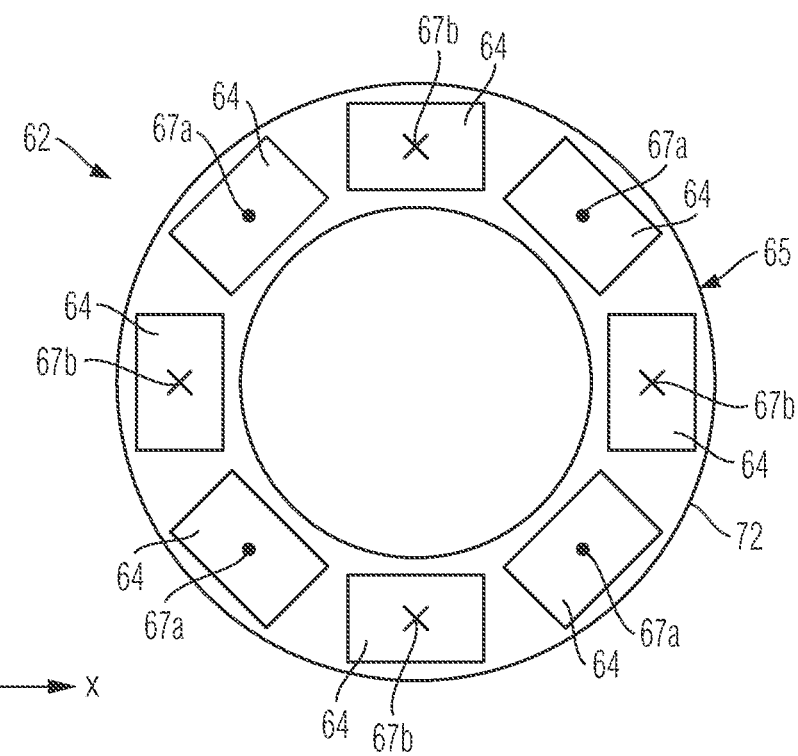
FIG. 3 depicts a top-down view of a first embodiment of a clamping member of the vibration isolator according to FIGS. 1 and 2.
Figure 4:
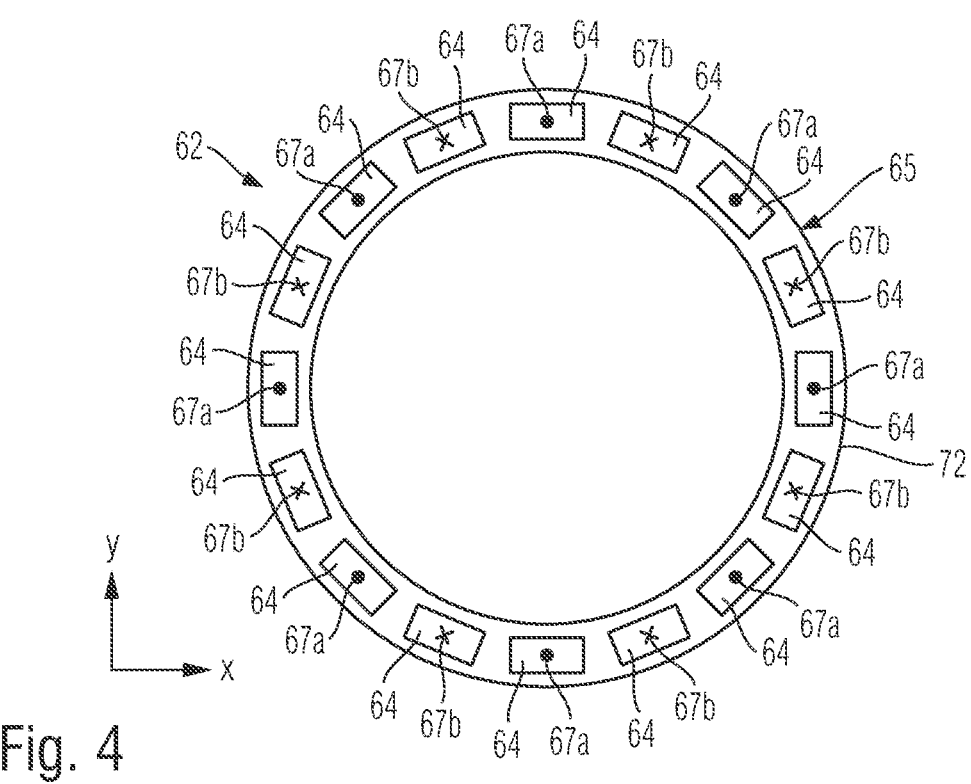
FIG. 4 depicts a top-down view of a second embodiment of a clamping member of the vibration isolator according to FIGS. 1 and 2.

The clamping member 62 and the support member 12 together form a clamping system 66. FIGS. 3 and 4 show different embodiments of the clamping member 62 in a top-down view. In both embodiments the housing-structure 65 of the clamping member 62 is ring-shaped holding a number of rectangular-shaped magnetic elements 64 arranged homogenously along the ring. In other words, the magnetic elements 64 are arranged along a rim 72 of the ring-shaped housing structure 65. The number of magnetic elements 64 is eight in the embodiment according to FIG. 3 and sixteen in the embodiment according to FIG. 4. In the embodiment according to FIG. 4 the size of each magnetic element 64 and the ring-width of the housing-structure 65 is correspondingly smaller. In a further embodiment, not shown in the drawings, only one magnetic element 64 having a ring-shape may be provided.

As depicted in FIG. 1, the support member 12 optionally comprises at least one magnet target 68 arranged opposite to the at least one magnetic element 64 in the clamping member 62. The magnet target 68 can be made from one piece and formed as a ring corresponding to the ring-shaped arrangement of the magnetic elements 64 shown in FIGS. 3 and 4.

According to an embodiment the same number of magnetic targets 68 are included in the support member 12 as there are magnetic elements 64 in the clamping member 62. Further, each of the magnet targets 68 is arranged opposite of a respective magnetic element 64 on the contact surface 18 side of the support member 12. That means, the magnet targets 68 and the magnetic elements 64 are respectively aligned to one another, being separated only by the membrane 20. The magnet targets 68 are arranged in recesses in the main body of the support member 12 and attached to the main body by bolts 70, such that the lower surface of the main body and the magnet targets 48 form an even surface acting as the contact surface 18.

The main body of the support member 12 may e.g. be made from aluminum. In case no separate magnet targets 68 are provided in the support member 12 the entire support member 12 may be made from a ferromagnetic material and therefore act as the magnet target itself.

At least one magnet target 68 may be of a material that can be magnetized, e.g. of a ferromagnetic material such as steel. Alternatively, the magnet target 68 may be a permanent magnet itself arranged such that its magnetic direction is oriented opposite to the magnetic direction of the magnetic element 64.

According to an embodiment the magnetic elements 64 depicted in FIG. 3 or FIG. 4 are arranged to alternate their respective magnetic orientation 67a and 67b from element 64 to element 64. That means any two neighboring magnetic elements 64 are arranged with opposite magnetic orientations. In the magnetic orientation 67a, depicted in FIGS. 3 and 4 with a dot, the top side of the magnetic element 64 is the north pole of the magnet. In the magnetic orientation 67b, depicted with a cross, the top side of the magnetic element 64 is the south pole of the magnet.

The alternating orientation increases the effective magnetic clamping force between the support member 12 and the clamping member 62. According to an embodiment the magnetic force between each magnetic element 64 and the respective magnet target 68 may be on the order of 500 N, resulting in a clamping force between the support member 12 and the clamping member 62 for the embodiment according to FIG. 3 of at least 4000 N. Given a coefficient of static friction between the support member 12 and the membrane 20 of about 0.5, the resulting resistive force of friction would be on the order of 2000 N.

Figure 5:
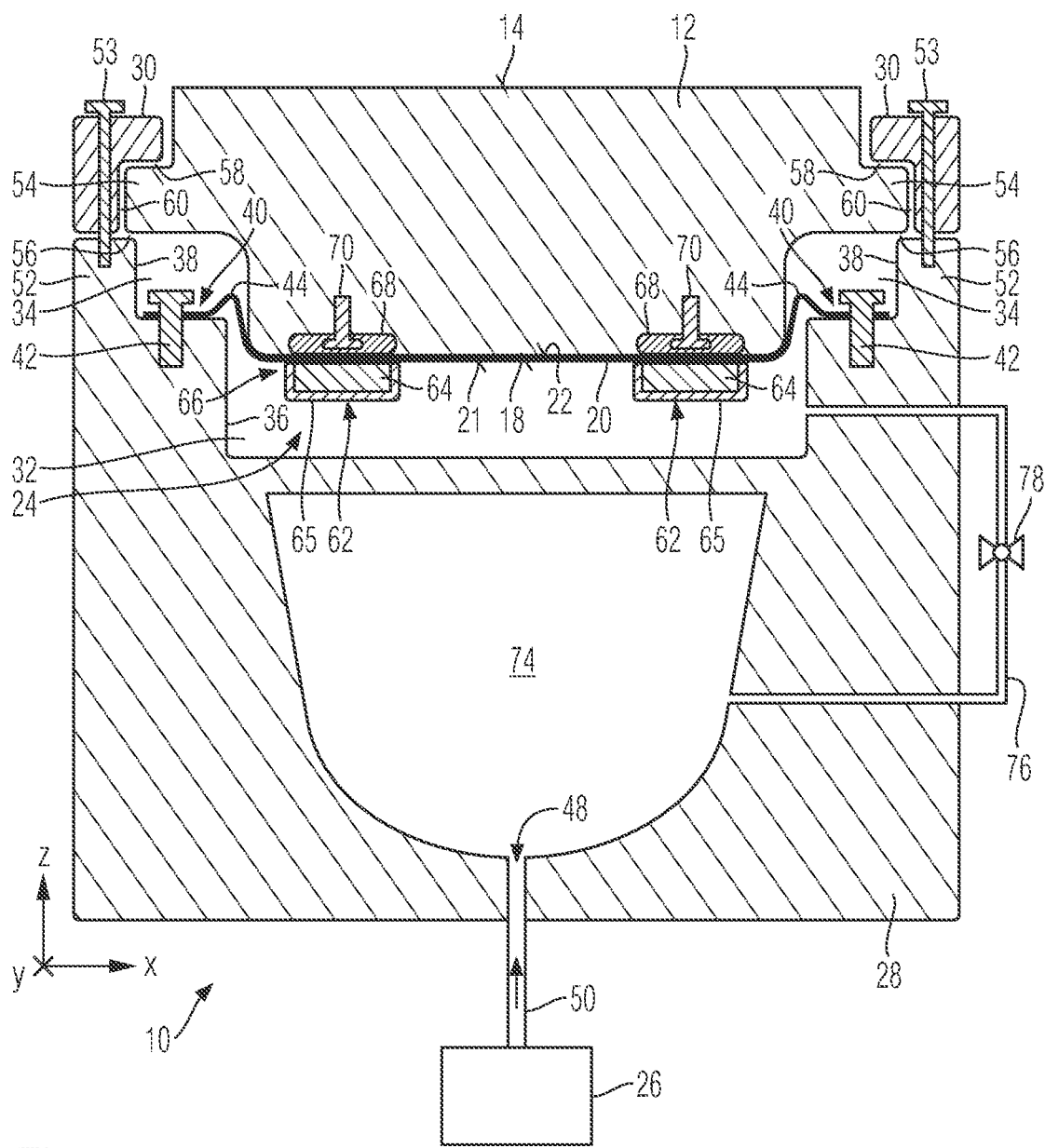
FIG. 5 depicts a cross section of a second embodiment of a vibration isolator having a damping chamber.

FIG. 5 shows a cross section of another embodiment of a vibration isolator 10 according to the invention. The vibration isolator 10 according to FIG. 5 differs from the embodiment according to FIG. 1 only in that the base structure 28 further comprises a damping chamber 74, which is connected to the gas compartment 24 via a connection line 76 in form of a pipe. The connection line 76 has a small diameter so that it poses a restriction for the gas flowing between the gas compartment 24 and the damping chamber 74. Further, the connection line 76 is provided with a throttle valve 78, which allows the restriction posed by the connection line 76 to vary according to need. The pressure supply line 50 is connected to the damping chamber 74 instead of directly to the gas compartment 24, as is the case in the embodiment according to FIG. 1.

The provision of the damping chamber 74 allows the gas from the gas compartment 24 to flow back and forth between the gas compartment 24 and the damping chamber 74 when compensating for vibrations with a large amplitude, which improves the vibration isolation properties of the vibration isolator 10.

The above description of exemplary embodiments, embodiments or embodiment variants is to be understood to be by way of example. The disclosure effected thereby firstly enables the person skilled in the art to understand the present invention and the advantages associated therewith, and secondly encompasses alterations and modifications of the described structures and methods that would be within the skill and understanding of the person skilled in the art. Therefore, all such alterations and modifications, insofar as they fall within the scope of the invention in accordance with the definition in the accompanying claims, and equivalents are intended to be covered by the protection of the claims.

LIST OF REFERENCE SIGNS 10 vibration isolator
12 support member
14 support surface
16 axis
18 contact surface
20 membrane
21 inner surface
22 outer surface
24 gas compartment
26 pressure supply device
28 base structure
30 bracket
32 first cutout
34 second cutout
36 sidewall of first cutout
38 sidewall of second cutout
40 shoulder area
42 bolt
44 bulged section
46 bottom part
48 opening
50 pressure supply line
53 bolt
52 top ring-shaped section of the base structure
54 protrusion
56 gap
58 gap
60 gap 62 clamping member
64 magnetic element
65 housing structure
66 clamping system
67a first magnetic orientation
67b second magnetic orientation
68 magnet target
70 bolt
72 rim
74 damping chamber
76 connection line
78 throttle valve

What is claimed is:

1. Vibration isolator for supporting a payload and isolating the payload from vibrations, comprising:
    a pressurized gas compartment formed with a rigid base structure, which base structure has an opening covered with a flexible membrane having an inner surface facing towards the gas compartment and an outer surface facing in a direction facing away from the gas compartment,
    a support member configured to support the payload, which support member is arranged in contact with the outer surface of the membrane, and
    a clamping member arranged at the inner surface of the membrane, wherein the support member and the clamping member form a clamping system, which system comprises at least one magnetic element effecting a magnetic force pressing the membrane against the support member.

2. Vibration isolator according to claim 1,
wherein the magnetic element is configured as a permanent magnet.

3. Vibration isolator according to claim 1,
wherein the magnetic element is comprised by the clamping member.

4. Vibration isolator according to claim 1,
wherein the clamping member is ring shaped.

5. Vibration isolator according to claim 1,
wherein a first one of the members of the clamping system comprises the magnetic element and a second one of the members comprises a magnet target arranged opposite to the magnetic element, and wherein the clamping system is configured to enable magnetic attraction between the magnetic element and the magnet target.

6. Vibration isolator according to claim 5,
wherein the first member of the clamping system comprises several magnetic elements arranged along a rim of the first member.

7. Vibration isolator according to claim 5,
wherein the first member of the clamping system is the clamping member and the second member of the clamping system is the support member.

8. Vibration isolator according to claim 1,
wherein the clamping system comprises at least two magnetic elements arranged with opposite magnetic orientations.

9. Vibration isolator according to claim 1,
wherein the clamping system comprises at least four magnetic elements arranged with alternating magnetic orientations.

10. Vibration isolator according to claim 1,
wherein a clamping force between the support member and the clamping member is at least 500 N.

11. Vibration isolator according to claim 1,
wherein a coefficient of static friction between the support member and the membrane is at least 0.1.

12. Vibration isolator according to claim 1,
wherein a pressure in the gas compartment is at least 2 bar higher than an ambient pressure.

13. Vibration isolator according to claim 1,
which is configured to operate in a vacuum.

14. Vibration isolator according to claim 1,
further comprising a damping chamber which is connected to the gas compartment via a restriction and/or via a valve.

15. Vibration isolator according to claim 14,
wherein the damping chamber is connected to a pressure supply line.

16. Vibration isolator for supporting a payload and isolating the payload from vibrations, comprising:
    a pressurized gas compartment formed with a rigid base structure, which base structure has an opening covered with a flexible membrane having an inner surface facing towards the gas compartment and an outer surface facing in a direction facing away from the gas compartment,
    a support member configured to support the payload, which support member is arranged in contact with the outer surface of the membrane via an extended contact surface of the support member, wherein the extended contact surface covers at least 50% of the outer surface of the membrane, and
    a clamping member arranged at the inner surface of the membrane, wherein the support member and the clamping member form a clamping system, which system comprises at least one magnetic element effecting a magnetic force pressing the membrane against the support member.

* * * * *